US011006259B2

(12) United States Patent
Zhu et al.

(10) Patent No.: US 11,006,259 B2
(45) Date of Patent: *May 11, 2021

(54) SYSTEM ACQUISITION MECHANISM FOR FIXED DEVICES IN MOBILE BROADBAND NETWORKS

(71) Applicant: Intel Corporation, Santa Clara, CA (US)

(72) Inventors: Jing Zhu, Portland, OR (US); Rath Vannithamby, Portland, OR (US); Ali T. Koc, Portland, OR (US); Maruti Gupta, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/046,862

(22) Filed: Jul. 26, 2018

(65) Prior Publication Data

US 2019/0045340 A1 Feb. 7, 2019

Related U.S. Application Data

(63) Continuation of application No. 15/223,357, filed on Jul. 29, 2016, now Pat. No. 10,111,023, which is a (Continued)

(51) Int. Cl.
*H04W 4/70* (2018.01)
*H04B 7/0456* (2017.01)
(Continued)

(52) U.S. Cl.
CPC ............ *H04W 4/70* (2018.02); *H04B 7/0456* (2013.01); *H04L 5/003* (2013.01); *H04L 5/0037* (2013.01);
(Continued)

(58) Field of Classification Search
None
See application file for complete search history.

(56) References Cited

U.S. PATENT DOCUMENTS 6,934,544 B2   8/2005   Cooper et al.
7,194,264 B2   3/2007   Li et al.
(Continued)

FOREIGN PATENT DOCUMENTS

CN   ZL20118070551.X   6/2017
CN   106992948 A       7/2017
(Continued)

OTHER PUBLICATIONS

Office Action received for European Patent Application No. 16204971.2, dated Jan. 17, 2019, 6 pages.
(Continued)

*Primary Examiner* — Saba Tsegaye
(74) *Attorney, Agent, or Firm* — Spectrum IP Law Group LLC

(57) ABSTRACT

Briefly, in accordance with one or more embodiments, a fixed device synchronizes with a downlink channel of a network, acquires a master information block including a last system update time; and executes cell selection without acquiring other system information if the last system update time is before the last system access time. Furthermore, the fixed device may listen only for system information block messages that it needs, and ignore other system information blocks. A bitmap may indicate which system information block messages should be listed to for fixed devices, and which may be ignored. In some embodiments, one or more system information blocks may be designated for fixed devices.

18 Claims, 8 Drawing Sheets

Related U.S. Application Data continuation of application No. 13/995,163, filed as application No. PCT/US2011/062824 on Dec. 1, 2011, now Pat. No. 9,439,134.

(60) Provisional application No. 61/471,042, filed on Apr. 1, 2011.

(51) Int. Cl.

| | |
|---|---|
| H04W 52/02 | (2009.01) |
| H04L 25/02 | (2006.01) |
| H04L 25/03 | (2006.01) |
| H04W 48/16 | (2009.01) |
| H04W 48/20 | (2009.01) |
| H04L 5/00 | (2006.01) |
| H04L 12/26 | (2006.01) |
| H04L 12/721 | (2013.01) |
| H04L 29/06 | (2006.01) |
| H04W 24/00 | (2009.01) |
| H04W 24/02 | (2009.01) |
| H04W 24/10 | (2009.01) |
| H04W 28/08 | (2009.01) |
| H04W 52/14 | (2009.01) |
| H04W 52/18 | (2009.01) |
| H04W 72/04 | (2009.01) |
| H04W 56/00 | (2009.01) |
| H04W 88/02 | (2009.01) |
| H04W 88/08 | (2009.01) |
| H04W 92/20 | (2009.01) |
| H04W 48/10 | (2009.01) |
| H04W 48/12 | (2009.01) |

(52) U.S. Cl.
CPC ........ *H04L 5/0094* (2013.01); *H04L 25/0206* (2013.01); *H04L 25/0226* (2013.01); *H04L 25/03343* (2013.01); *H04L 43/50* (2013.01); *H04L 45/70* (2013.01); *H04L 65/608* (2013.01); *H04W 24/00* (2013.01); *H04W 24/02* (2013.01); *H04W 24/10* (2013.01); *H04W 28/08* (2013.01); *H04W 48/16* (2013.01); *H04W 48/20* (2013.01); *H04W 52/0216* (2013.01); *H04W 52/0219* (2013.01); *H04W 52/146* (2013.01); *H04W 52/18* (2013.01); *H04W 56/001* (2013.01); *H04W 72/042* (2013.01); *H04W 72/0413* (2013.01); *H04W 72/0453* (2013.01); *H04L 5/005* (2013.01); *H04L 25/0328* (2013.01); *H04L 2025/03426* (2013.01); *H04L 2025/03802* (2013.01); *H04W 48/10* (2013.01); *H04W 48/12* (2013.01); *H04W 88/02* (2013.01); *H04W 88/08* (2013.01); *H04W 92/20* (2013.01); *Y02D 30/70* (2020.08)

(56) References Cited

U.S. PATENT DOCUMENTS

| | | | |
|---|---|---|---|
| 8,879,449 B2 | 11/2014 | Sung et al. | |
| 10,091,762 B2* | 10/2018 | Kitazoe | H04W 48/12 |
| 2005/0153700 A1* | 7/2005 | Farnsworth | H04W 48/16 |
| | | | 455/446 |
| 2005/0177623 A1* | 8/2005 | Roberts | H04W 48/12 |
| | | | 709/213 |
| 2006/0166693 A1* | 7/2006 | Jeong | H04W 48/16 |
| | | | 455/525 |
| 2006/0281456 A1 | 12/2006 | Roberts et al. | |
| 2007/0260851 A1 | 11/2007 | Taha et al. | |
| 2008/0253323 A1 | 10/2008 | Fischer | |
| 2009/0253422 A1* | 10/2009 | Fischer | H04W 48/08 |
| | | | 455/418 |
| 2009/0316603 A1 | 12/2009 | Amerga et al. | |
| 2010/0124919 A1 | 5/2010 | Ko et al. | |
| 2011/0002250 A1* | 1/2011 | Wang | H04W 76/40 |
| | | | 370/311 |
| 2012/0039171 A1* | 2/2012 | Yamada | H04L 47/12 |
| | | | 370/232 |
| 2012/0184205 A1 | 7/2012 | Luft et al. | |
| 2012/0322467 A1 | 12/2012 | Obuchi et al. | |
| 2013/0188503 A1* | 7/2013 | Anepu | H04W 24/10 |
| | | | 370/252 |
| 2014/0206306 A1* | 7/2014 | Wu | H04W 76/40 |
| | | | 455/404.1 |

FOREIGN PATENT DOCUMENTS

| | | |
|---|---|---|
| EP | 2247145 A1 | 11/2010 |
| EP | 2477443 A1 | 7/2012 |
| EP | 2695445 B1 | 5/2017 |
| EP | 3171640 A1 | 5/2017 |
| WO | 2011029271 A1 | 3/2011 |
| WO | 2013/105914 A2 | 7/2013 |

OTHER PUBLICATIONS

Taleb, et al., "Machine Type Communications in 3GPP Networks: Potential, Challenges, and Solutions," IEEE Communications Magazine, Mar. 2012, pp. 178-184, IEEE.
Ericsson, "Revised WI: Further LTE Physical Layer Enhancements for MTC," Document for Approval, Sep. 9-12, 2014, 9 pages, RP-141865, 3GPP TSG RAN Meeting #66, Edinburgh, Scotland.
Letters Patent for CN ZL201710151807.9 issued on Oct. 23,2020.
Notification to Grant Patent Right for Invention dated Jul. 6, 2020, to CN Patent Application No. 201710151807.9.
European Application No. 11879160.7-1854/2695445, Certificate of Grant, dated May 10, 2017, 1 pages.
European Application No. 11879160.7-1854/2695445, Decision to Grant, dated Apr. 13, 2017, 2 pages.
Extended European Search Report received for European Patent Application No. 16204971.2, dated Mar. 21, 2017, 13 pages.
Lee, et al. "Small Data Transmission for Fixed M2M Devices in Idle Mode", Mar. 6, 2011, 4 pages, vol. 802.16p, IEEE, Piscataway, NJ.
Notice of Allowance received for Chinese Patent Application No. 201180070551.X, dated Mar. 3, 2017, 5 pages including 3 pages of English translation.
Notification of Publication received for Hong Kong Patent Application No. 201710151807.9, published on Mar. 9, 2018 as publication No. 1235575A, 1 page.
Office Action received for Chinese Patent Application No. 201180070551.X, dated Sep. 14, 2016, 13 pages including 8 pages of English translation.

\* cited by examiner

SYSTEM ACQUISITION MECHANISM FOR FIXED DEVICES IN MOBILE BROADBAND NETWORKS

CROSS-REFERENCE TO RELATED APPLICATIONS

The present application is a continuation of U.S. application Ser. No. 15/223,357 filed on Jul. 29, 2016, which in turn is a continuation of U.S. application Ser. No. 13/995,163 filed on Sep. 18, 2013, which is the National Stage Application of International Application No. PCT/US2011/062824 filed on Dec. 1, 2011, which in turn claims the benefit of U.S. Provisional Application No. 61/471,042 filed Apr. 1, 2011. Said application Ser. Nos. 15/223,357, 13/995,163, PCT/US2011/062824, and 61/471,042 are hereby incorporated herein by reference in their entireties.

BACKGROUND

In a wireless mobile broadband system such as a Third Generation Partnership Project (3GPP) Long Term Evolution (LTE) network, a user equipment (UE) device performs a network acquisition process in order to get connected to the network. The network acquisition process comprises the following steps: UE power up; downlink synchronization and determination of the physical cell identifier (ID); Master Information Block (MIB) acquisition; shared channel resource acquisition; control information acquisition; retrieval of System Information Blocks (SIBs); cell selection; and initial access by the UE on the network. However, since a fixed UE generally does not move, it would be beneficial for a fixed UE to skip any of the network acquisition steps that are geared toward mobile devices and which may not be required by a fixed UE in order to speed up initial network entry by a fixed UE.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
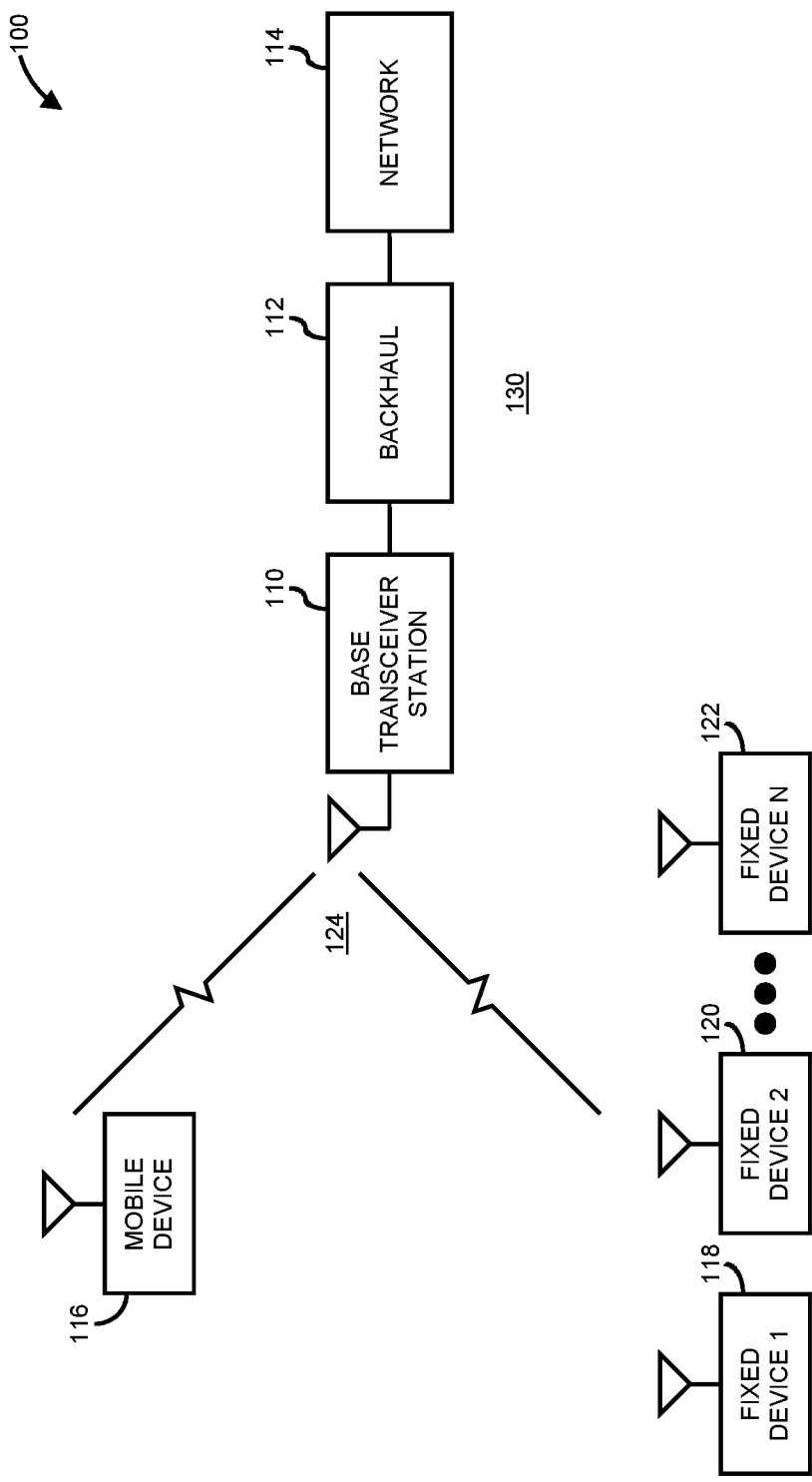
FIG. 1 is a block diagram of an example machine-to-machine (M2M) system which may utilize enhanced system acquisition for fixed devices in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, a block diagram of an example machine-to-machine (M2M) system which may utilize enhanced system acquisition for fixed devices in accordance with one or more embodiments will be discussed. As shown in FIG. 1, a machine-to-machine (M2M) system 100 may comprise a base transceiver station (BTS) 110 coupled to a network 114 via backhaul 112. The base transceiver station 110 may provide an air interface 124 between one or more mobile devices such as mobile device 116 and/or one or more fixed devices such as a first fixed device 118, a second fixed device 120, up to an Nth fixed device 122. The base transceiver station 110 may be deployed in a cell of a mobile broadband network such as a Long Term Evolution (LTE) network as discussed herein. The fixed devices and/or the mobile devices and the base transceiver station 110 together comprise an air interface 124, and backhaul 112 and network 114 comprise a core network 130. In some embodiments as will be discussed in further detail with respect to FIG. 2 below, M2M system 100 may comprise a mobile broadband network in accordance with a Long Term Evolution (LTE) standard wherein base transceiver station 110 comprises an enhanced Node B (eNB) and the mobile devices and fixed devices comprise user equipment (UE). Furthermore, in some embodiments network 114 may comprise the Internet. In one or more alternative embodiments, M2M system 100 may comprise any various type of broadband network such as Worldwide Interoperability for Microwave Access (WiMAX) network in accordance with an Institute for Electrical and Electronics Engineers (IEEE) standard such as an IEEE 802.16e standard, or a WiMAX-II network in accordance with an IEEE 802.16m standard. Furthermore, M2M system 100 may be compliant with an IEEE 802.16p standard. However, these are merely example implementations for M2M system 100, and the scope of the claimed subject matter is not limited in these respects.

In one or more embodiments, fixed devices such as fixed device 118, fixed device 120 or fixed device 122 may utilize random access to communicate via M2M network. In such embodiments, M2M system 100 allows for the devices to communicate data they may have to transmit over the core network 130 to a remote device or server coupled to network 114 when such data is available. For example, field data may be gathered by the devices and sent back to a monitoring station for collection and analysis. In such an example, the fixed devices such as fixed device 118, fixed device 120, and fixed device 122 may comprise parking meters. When the parking meter is full of coins and is ready to be emptied, a given parking meter may communicate its state to a monitoring server coupled to network 114, in which case an operator may then go that parking meter and remove the coins stored therein. The parking meter may then continue to operate until it is again full and sends a subsequent signal to the monitoring server. As another example, the fixed devices may comprise vending machines such as a drink vending machine. A given machine may communicate to a remote server that a given drink is low to indicate that an operator should come to that machine and refill the low drink. In yet another example, fixed devices may be deployed to monitor for the presence of a specified hazardous substance such as a chemical agent, a biological agent, and/or a radionuclide wherein the fixed device 118 includes an appropriate sensor. In the event the fixed device 118 detects the presence of the target substance, the fixed device may communicate to a remote server of the result and/or that an appropriate response should be taken. Various other types of fixed devices may be deployed in M2M system 100, and the scope of the claimed subject matter is not limited in these respects. In one or more embodiments, M2M system 100 may comprise a mobile broadband network such as an LTE network as shown in and described with respect to FIG. 2, below.

Figure 2:
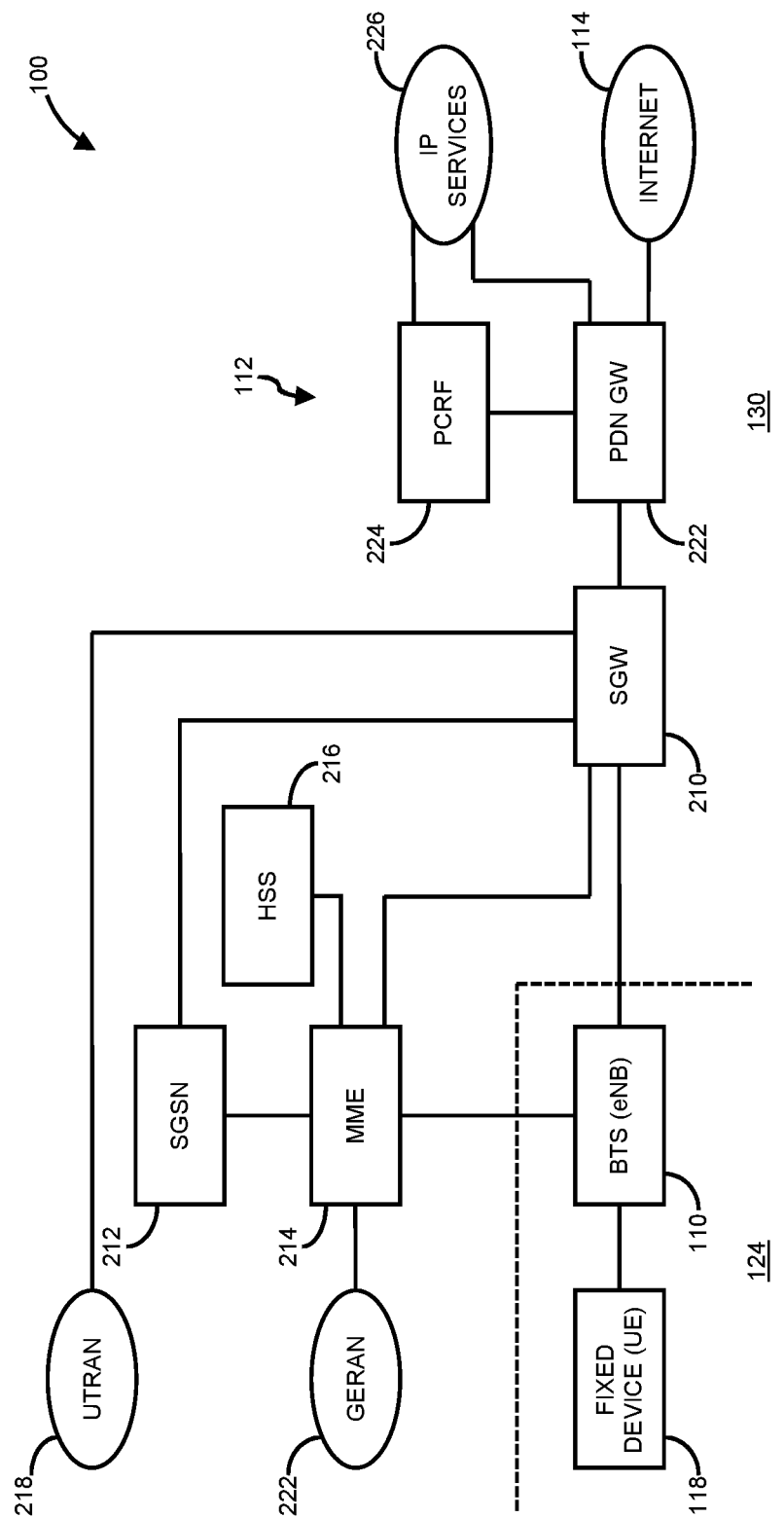
FIG. 2 is a block diagram of an example machine-to-machine (M2M) system as shown in FIG. 1 wherein the system may include a Long Term Evolution (LTE) network or the like for broadband access in accordance with one or more embodiments.

Referring now to FIG. 2, a block diagram of an example machine-to-machine (M2M) system of FIG. 1 wherein the system may include a Long Term Evolution (LTE) network or the like for broadband access in accordance with one or more embodiments will be discussed. FIG. 2 shows a block diagram of the overall architecture of machine-to-machine (M2M) system 100 comprising a Third Generation Partnership Project (3GPP) Long Term Evolution (LTE) network that includes network elements and standardized interfaces. At a high level, M2M system 100 comprises a core network (CN) 130, also referred to as an evolved Packet System (EPC), and an air-interface access network 124, also referred to as an evolved Universal Terrestrial Radio Access Network (E-UTRAN). Core network 130 is responsible for the overall control of the various User Equipment (UE), such as fixed device 118, connected to the M2M system 100 and for the establishment of the bearers. Air interface network 124 is responsible for radio-related functions in communication with base transceiver station 110, also referred to as an enhanced Node B (eNB).

The main logical nodes of core network 130 provide a backhaul 112 include a Serving General Packet Radio Service (GPRS) Support Node (SGSN) 212, Mobility Management Entity (MME) 214, a Home Subscriber Server (HSS) 216, a Serving Gateway (SGW) 210, a Packet Data Network (PDN) Gateway (PDN GW) 222, and a Policy and Charging Rules Function (PCRF) Manager 224. Serving Gateway 210 couples to Universal Terrestrial Radio Access Network (UTRAN) 218 to couple base transceiver station 110 as eNB to one or more other eNBs. Mobility Management Entity 214 couples to Global System for Mobile Communications (GSM) Enhanced Data rates for GSM Evolution (EDGE) Radio Access Network (GERAN) 220 to couple base transceiver station 110 and base station controller as A interfaces to one or more other base transceiver stations. The network elements of core network 130 are interconnected by standardized interfaces to provide various network functions, and the scope of the claimed subject matter is not limited in these respects.

While core network 130 includes many logical nodes, air interface network 124 comprises base transceiver station 110 as an evolved Node B (eNB) that connects to one or more User Equipment (UE) such as fixed device 118. Although FIG. 2 shows on user equipment, multiple fixed devices and/or mobile devices may coupe with base transceiver station 110, and the scope of the claimed subject matter is not limited in this respect. For normal user traffic, as opposed to broadcast traffic, there is no centralized controller air interface, and as such the architecture of air interface 124 is referred to as flat. Multiple eNBs may be interconnected via an interface referred to as "X2" and to the evolved packet core network 130 by an S1 interface, more specifically to MME 214 by an S1-MME interface and to the SGW 210 by an S1-U interface. The protocols that run between the eNBs and the UEs are generally referred to as action script (AS) protocols.

In one or more embodiments, the baste transceiver station 110 as an eNB hosts the physical (PHY), Medium Access Control (MAC), Radio Link Control (RLC), and Packet Data Control Protocol (PDCP) layers, and which include the functionality of user-plane header-compression and encryption. Base transceiver station 110 also provides Radio Resource Control (RRC) functionality corresponding to the control plane, and performs many functions including radio resource management, admission control, scheduling, enforcement of negotiated uplink (UL) quality of service (QoS), cell information broadcast, ciphering/deciphering of user and control plane data, and compression/decompression of downlink/uplink (DL/UL) user plane packet headers.

The RRC layer in base transceiver station 110 covers functions related to the radio bearers, such as radio bearer control, radio admission control, radio mobility control, scheduling and dynamic allocation of resources to UEs in both uplink and downlink, source rate and PIT adaptation, header compression for efficient use of the radio interface, security of all data sent over the radio interface, and connectivity to the evolved packet core network 130. The RRC layer makes handover decisions based on neighbor cell measurements sent by the UEs, generates pages for the UEs over the air, broadcasts system information, controls UE measurement reporting, such as the periodicity of Channel Quality Information (CQI) reports, and allocates cell-level temporary identifiers to active UEs. The RRC layer also executes transfer of UE context from a source eNB to a target eNB during handover, and provides integrity protection for RRC messages. Additionally, the RRC layer is responsible for the setting up and maintenance of radio bearers. In addition, PCRF 224 and PDN GW couple to Internet protocol (IP) services 226 and network 114 which may comprise the Internet. Thus, FIG. 2 shows an embodiment of M2M system 100 as a 3GPP LTE network as one of several example broadband networks, and the scope of the claimed subject matter is not limited in this respect. An example method of network access for a fixed device is shown in and described with respect to FIG. 3, below.

Figure 3:
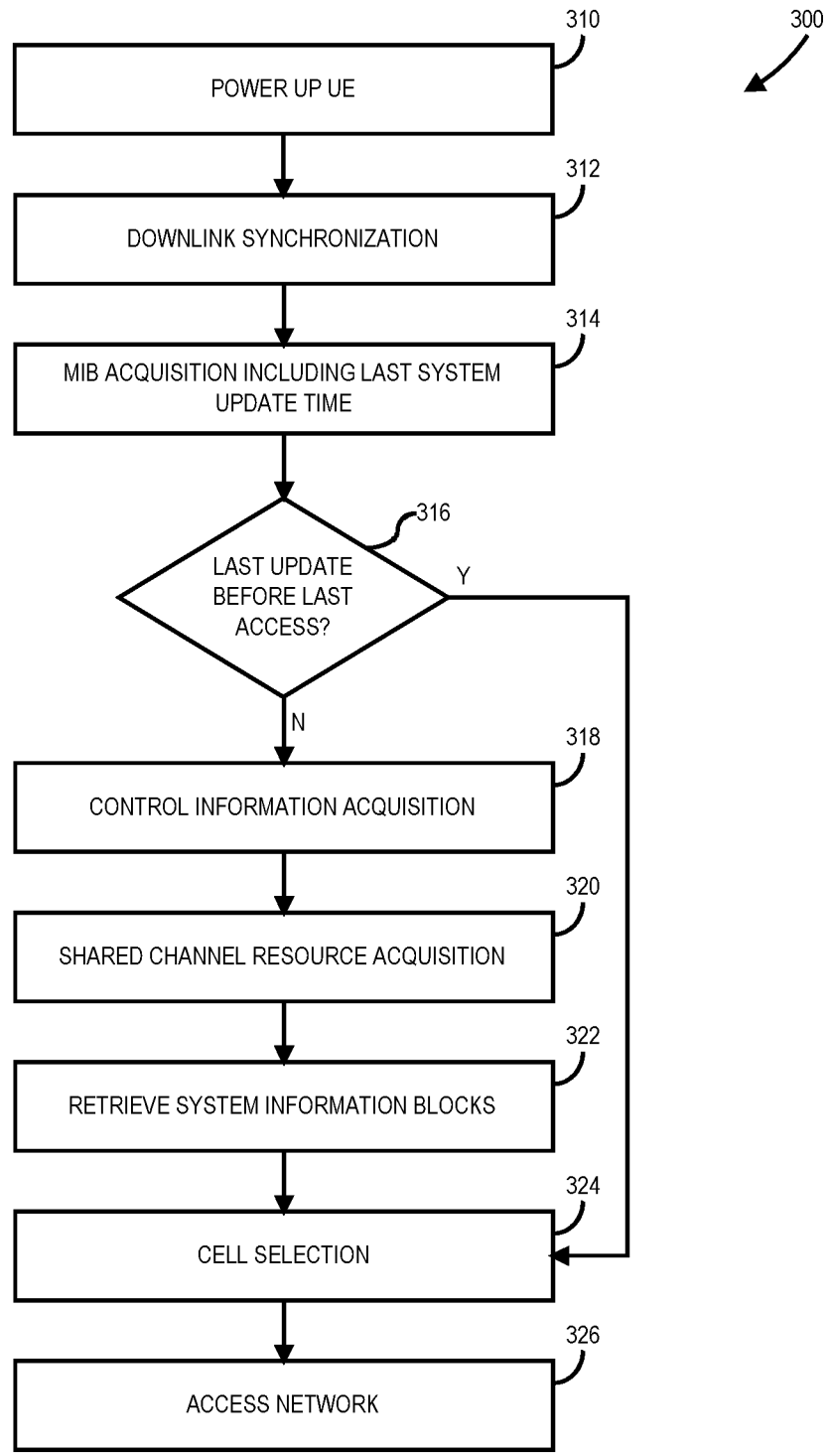
FIG. 3 is a flow diagram of a method of network access for a fixed device based on modified master information block acquisition in accordance with one or more embodiments.

Referring now to FIG. 3, a flow diagram of a method of network access for a fixed device based on modified master information block acquisition in accordance with one or more embodiments will be discussed. Method 300 illustrates one particular embodiment of a method of network access for a fixed device based on modified master information block acquisition in a mobile broad band network. However, in one or more alternative embodiments, various other orders of the blocks of method 300 may be implemented, with more or fewer blocks, and the scope of the claimed subject matter is not limited in this respect. As shown in FIG. 3, method 300 comprises a method by which a fixed device 118 user equipment (UE) may implement to perform network access to connect to M2M system 100 of FIG. 1. Method 300 for a fixed device 118 UE is substantially similar to a method by which mobile devices may perform network access with the following modifications. At block 310, the UE may power up and then may perform downlink synchronization at block 312. The UE may then perform master information block (MIB) acquisition at block 314. In one or more embodiments, the base transceiver station 110 or enhanced Node B (eNB) may include an optional field transmitted in the MIB that indicated to the UE the time and/or date information when the information for M2M system 100 was last updated. For example, the MIB field may comprise an 8-digit field called "Last System Update Time" wherein four digits may indicate the year, two digits may indicate the month, and two digits may indicate the day. When the fixed device 118 UE receives this MIB field from the eNB, a determination may be made at decision block 316 whether the last update time as indicated in the MIB field occurred before the last time that the fixed device 118 UE accessed the system. If the last system update time occurred before the last access, then the UE already has the most up to date system information, and the UE may proceed directly to cell selection at block 324. Otherwise, if the last system update time occurred after the last time that the UE accessed the system, then the UE needs to obtain the updated system information by acquiring control information at block 318, acquiring shared channel resource information at block 320, and retrieving system information blocks at block 322. After obtaining the updated system information, the UE may then perform cell selection at block 324. After cell selection, the UE may then access the network. In general, method 300 allows for fixed devices to obtain updated system information for M2M system 100 if the system information has not been updated since the last access time by the UE. The UE may store the date of its last successful access and also a copy of the system information obtained by the UE during its last successful access. The UE may use the date of the last successful access to compare to the MIB field information regarding the date/time of the last time at which the system information was update for executing decision block 316. If there has been no update to the system information, the UE may just use its stored system information from the last access to access the network. Method thus uses a modified master information block (MIB) to implement enhanced system access for fixed devices. A method of network access for a fixed device based on a system information block (SIB) is shown in and described with respect to FIG. 4, below.

Figure 4:
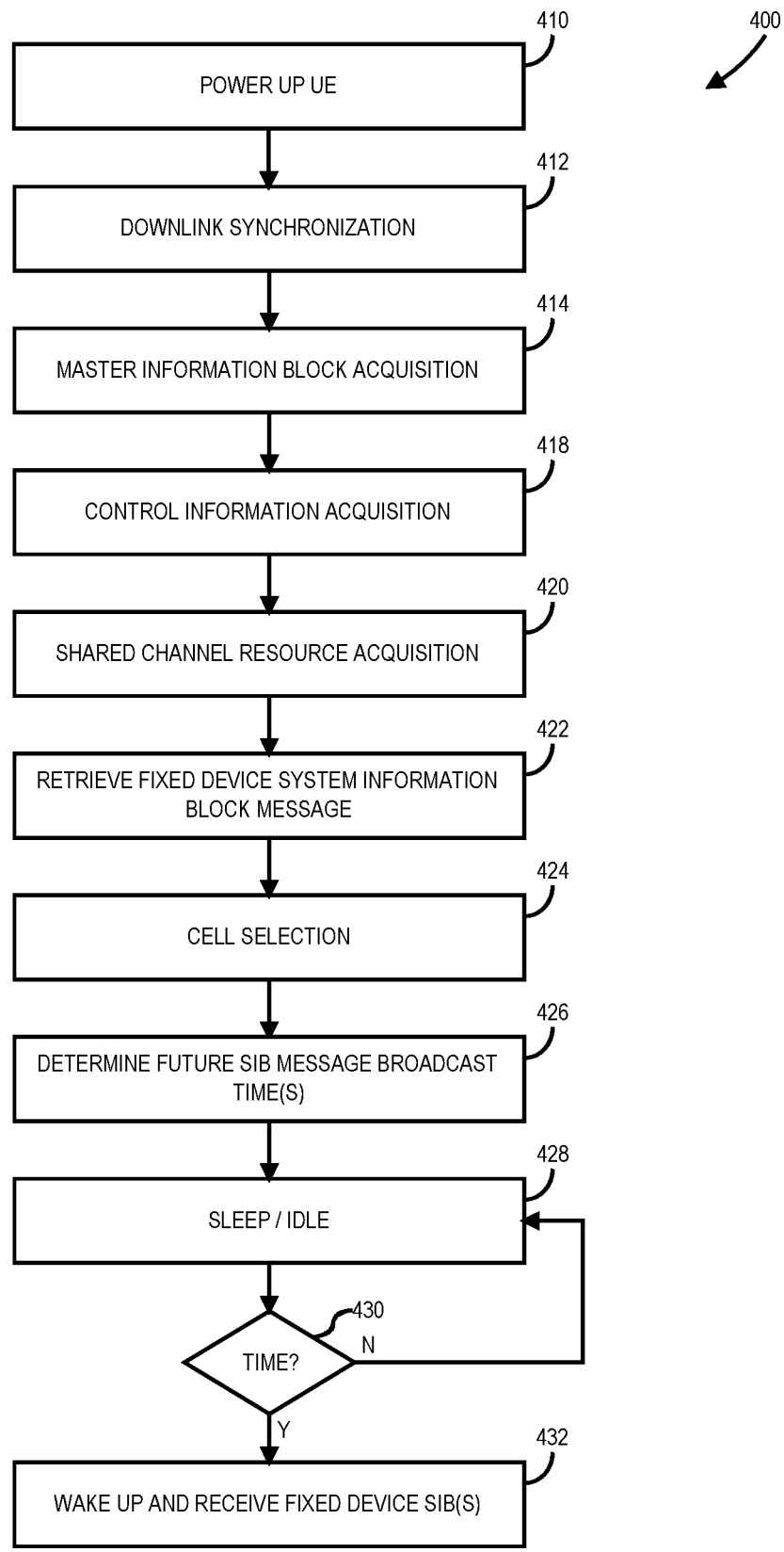
FIG. 4 is a flow diagram of a method of network access for a fixed device based on acquisition of a fixed device system information block in accordance with one or more embodiments.

Referring now to FIG. 4, a flow diagram of a method of network access for a fixed device based on acquisition of a fixed device system information block in accordance with one or more embodiments will be discussed. Method 400 illustrates one particular embodiment of a method of network access based on acquisition of a fixed device system information block in a mobile broad band network. However, in one or more alternative embodiments, various other orders of the blocks of method 400 may be implemented, with more or fewer blocks, and the scope of the claimed subject matter is not limited in this respect. As shown in FIG. 4, method 400 comprises a method by which a fixed device 118 user equipment (UE) may implement to perform network access to connect to M2M system 100 of FIG. 1. Method 400 for a fixed device 118 UE is substantially similar to a method by which mobile devices may perform network access with the following modifications. The fixed device 118 UE may power up at block 410, and may perform downlink synchronization at block 412. The UE may then acquire a master information block (MIB) at block 414, and may acquire control information at block 418. The UE then acquires shared channel resource information at block 420, and retrieves one or more fixed device system information block (SIB) messages at block 422. Cell selection may then be performed at block 424. After cell selection, the UE may determine the future time or times at which one or more future SIB messages may be broadcast by the eNB for the cell with which the UE is communicating. For a Long Term Evolution (LTE) type network, the eNB may transmit multiple system information block (SIB) messages. In one or more embodiments, one or more of the SIB messages may be defined as a separate SIB message intended for fixed machine-to-machine (M2M) devices. The fixed device 118 UE will monitor for broadcasts of the fixed device SIB messages and may ignore the other SIB messages that are intended for mobile devices. The fixed SIB messages may be broadcast at a specified time or times that the UE may determine from the eNB. After determining the broadcast time or times for future fixed device SIB messages, the fixed device 118 UE may enter into a sleep or idle mode at block 428. The UE may determine at block 420 when the next fixed SIB message broadcast time occurs, and may remain in a sleep or idle mode at block 428 until the time of the fixed device SIB message broadcast. When fixed device SIB messages are broadcast, the fixed device 118 UE may wake up and receive the fixed device SIB messages broadcast by the eNB. It should be noted that the time or times at which the fixed device 118 UE wakes up and receives the fixed device SIB messages may be the same time as or may be a different time from the time or times at which the fixed device 118 UE wakes up and transmits its data, and the scope of the claimed subject matter is not limited in this respect. By waking up to receive only the fixed device SIB messages while remaining in a sleep or idle mode when mobile device SIB messages are broadcast, fixed devices may conserve batter power as one example, although the scope of the claimed subject matter is not limited in this respect. An example method by which a fixed device may receive a bitmap to determine any change to the network access information is shown in and described with respect to FIG. 5, below.

Figure 5:
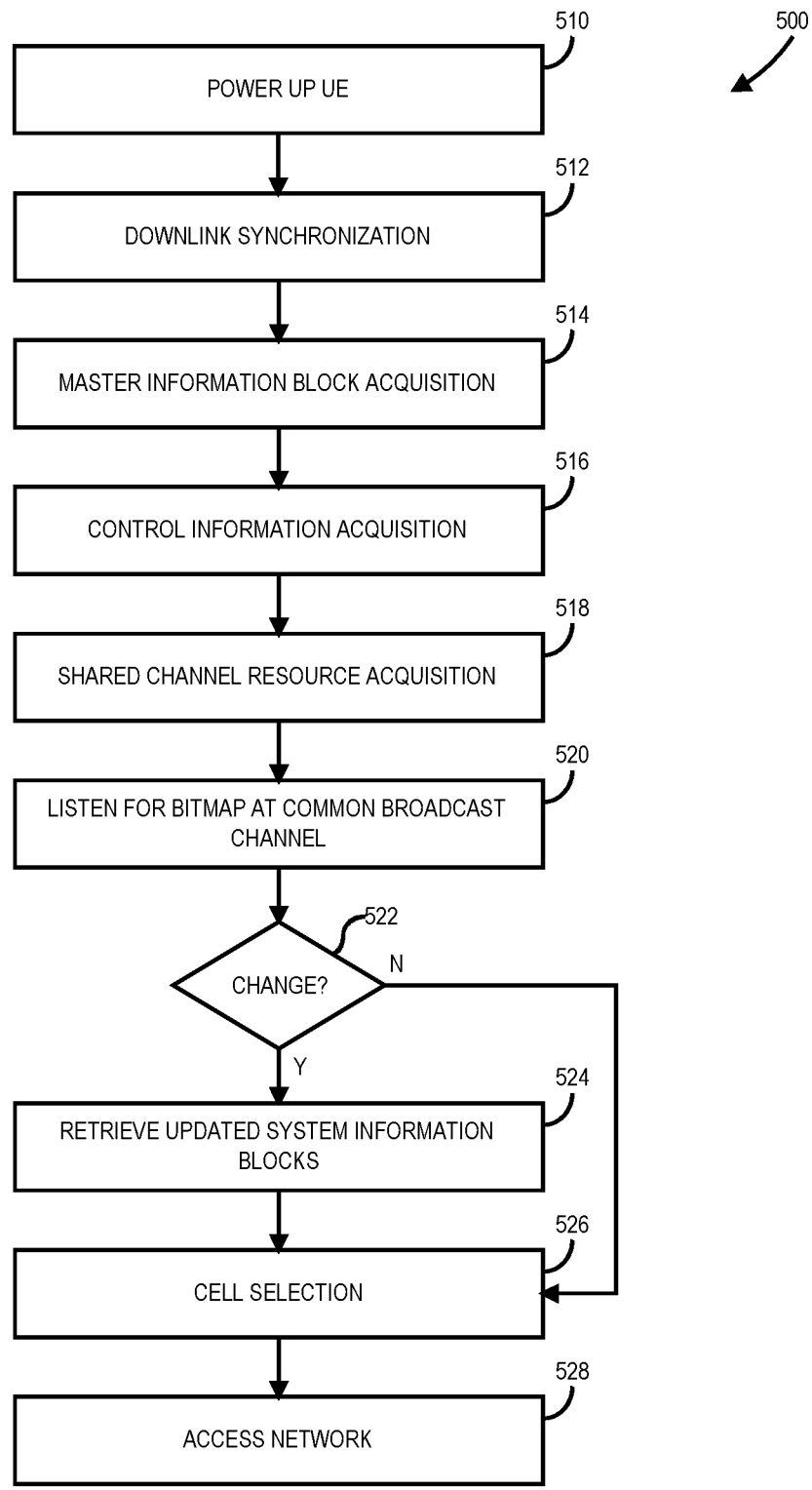
FIG. 5 is a flow diagram of a method of network access for a fixed device based on listening to a bitmap to determine any change to the network access information in accordance with one or more embodiments.

Referring now to FIG. 5, a flow diagram of a method of network access for a fixed device based on listening to a bitmap to determine any change to the network access information in accordance with one or more embodiments will be discussed. Method 500 illustrates one particular embodiment of a method of network access for a fixed device based on listening to a bitmap to determine any change to the network access information in a mobile broad band network. However, in one or more alternative embodiments, various other orders of the blocks of method 500 may be implemented, with more or fewer blocks, and the scope of the claimed subject matter is not limited in this respect. As shown in FIG. 5, method 500 comprises a method by which a fixed device 118 user equipment (UE) may implement to perform network access to connect to M2M system 100 of FIG. 1. Method 500 for a fixed device 118 UE is substantially similar to a method by which mobile devices may perform network access with the following modifications. The fixed device 118 UE may power up at block 510, and may perform downlink synchronization at block 512. The UE may then acquire master information block information at block 514, and may acquire control information at block 516. The UE acquires shared channel resource information at block 518. The UE may then listen at block 520 for a special bitmap broadcast at the common broadcast channel by the base transceiver station 110 or enhanced Node B (eNB). The fixed device 118 UE may listen for the broadcast bitmap instead of listening for every system information block (SIB) message that may be intended for mobile devices. Such a bitmap may be arranged so as to indicate whether there has been any change or no change to the system information in the last second, minute, hour, day, week, year, and so on. For example, the bitmap may be as follows:

| | |
|---|---|
| second bit | 0 |
| minute bit | 0 |
| day bit | 0 |
| week bit | 1 |
| month bit | 0 |

Thus, a 5-bit bit map may be broad cast at the common broadcast channel to indicate to the fixed devices when the last system update occurred. In the above example, the bitmap indicates that the system information was updated at least one week ago but less than one month ago. Other types of bitmaps may be utilized as well, with a fewer or greater number of bits, and the scope of the claimed subject matter is not limited in this respect. After receiving the bitmap broadcast by the eNB, the fixed device 118 UE compares at block 522 the received bitmap with a stored copy of a previous bitmap or timestamp for the last known time that the system information was updated. The fixed device 118 UE may store a local copy of a previously received bitmap and/or a timestamp of the last system update time. If there has been no change in the system information as determined at block 522, then the fixed device 118 UE may proceed directly to cell selection at block 526. Otherwise, if the system information has been updated, then the fixed device 118 UE retrieves one or more updated system information block messages at block 525 and then performs cell selection at block 526. In such an arrangement, the fixed device 118 UE does not need to listen to all of the SIB messages unless and until the system information is updated. If there has been no update, then the UE does not need to listen to the SIB messages. Furthermore, the bitmap broadcast by the eNB may track relative rather than absolute time so that the size of the bitmap may be reduced with respect to absolute time data, and therefore also may require less processing power as well. In some embodiments, when the fixed device 118 UE does retrieve updated system information block messages at block 524, the fixed device 1118 also may just retrieve SIB messages that are designated for fixed devices as shown in and described with respect to FIG. 6, below.

Figure 6:
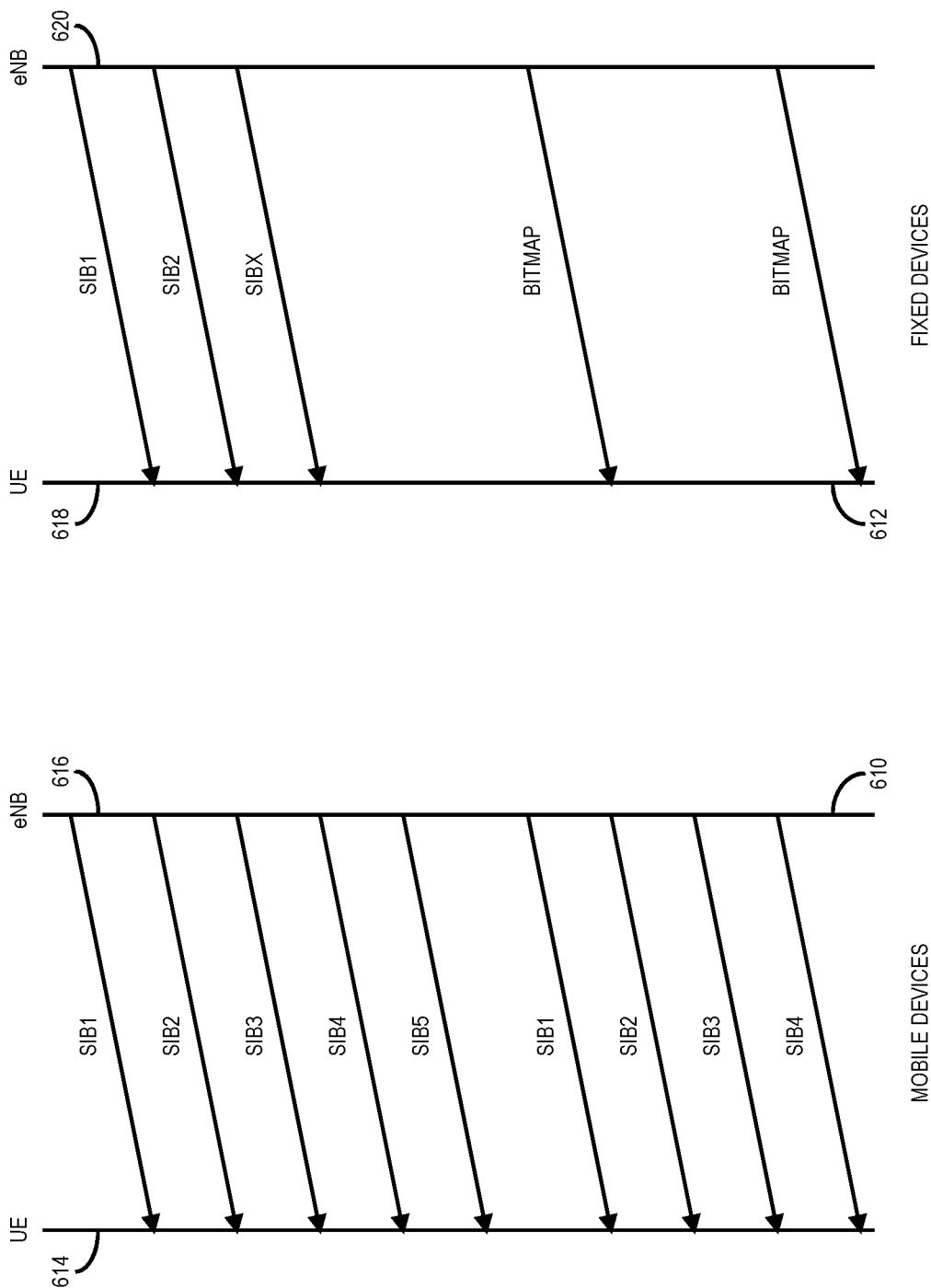
FIG. 6 is a diagram of the transmission of system information blocks for a mobile device versus a fixed device in accordance with one or more embodiments.

Referring now to FIG. 6, a diagram of the transmission of system information blocks for a mobile device versus a fixed device in accordance with one or more embodiments will be discussed. As shown in FIG. 6, an arrangement 610 or scheme for broadcasting system information block (SIB) messages for mobile devices is shown in comparison with an arrangement 612 or scheme for broadcasting system information block (SIB) messages for fixed devices. As shown in arrangement 610, SIB messages are sent from a base transceiver station 110 (eNB) at 616 to one or more mobile device 116 (UE) at 614. Mobile broadband networks such as Long Term Evolution (LTE) compliant systems support the transmission of multiple SIB messages, for example SIB1, SIB2, SIB3, SIB4, SIB5, and so on, as shown in arrangement 610. For fixed machine-to-machine (M2M) devices, listening to all of the multiple SIB messages for mobile devices is not required. As a result, in one or more embodiments, in the arrangement 612 for fixed devices, the base transceiver station 110 (eNB) at 620 may transmit a bitmap (BITMAP) to the fixed devices (UE) at 618 wherein the bitmap indicates which of the SIB messages the fixed devices need to listen to, and which SIB messages the fixed devices may safely ignore. For example, if there are eight unique SIB messages, an 8-bit bitmap may indicate which ones of the eight SIB messages the fixed devices may listen to. In some embodiments, the bitmap (BITMAP) may indicate which of the SIB messages have changed or not changed, and the fixed device 118 (UE) knows from the bitmap to listen for the changed SIB messages to that the fixed device 118 (UE) may update its own saved system information accordingly. Furthermore, the base transceiver station 110 (eNB) may transmit a special system information block (SIBX) message that is intended for fixed devices. For example, the special SIBX message for fixed devices may be the same or similar to the fixed device SIB message as descried with respect to FIG. 4, above. The bitmap (BITMAP) may indicate which one of the SIB messages is the SIBX message for fixed devices. Likewise, the bitmap (BITMAP) may indicate whether there has been any change to the SIBX message so that the fixed device 118 (UE) may ignore the SIBX message if it has not been updated and the fixed device (UE) has previously stored the SIBX message information, or to otherwise listen to the SIBX message when the bitmap (BITMAP) indicates that the SIBX message has been changed and needs to be updated at the fixed device 118 (UE). It should be known that the particular arrangement of the transmission of system information blocks for a mobile device versus a fixed device as shown in FIG. 6 is merely example of several possible arrangements, and the scope of the claimed subject matter is not limited in this respect.

Figure 7:
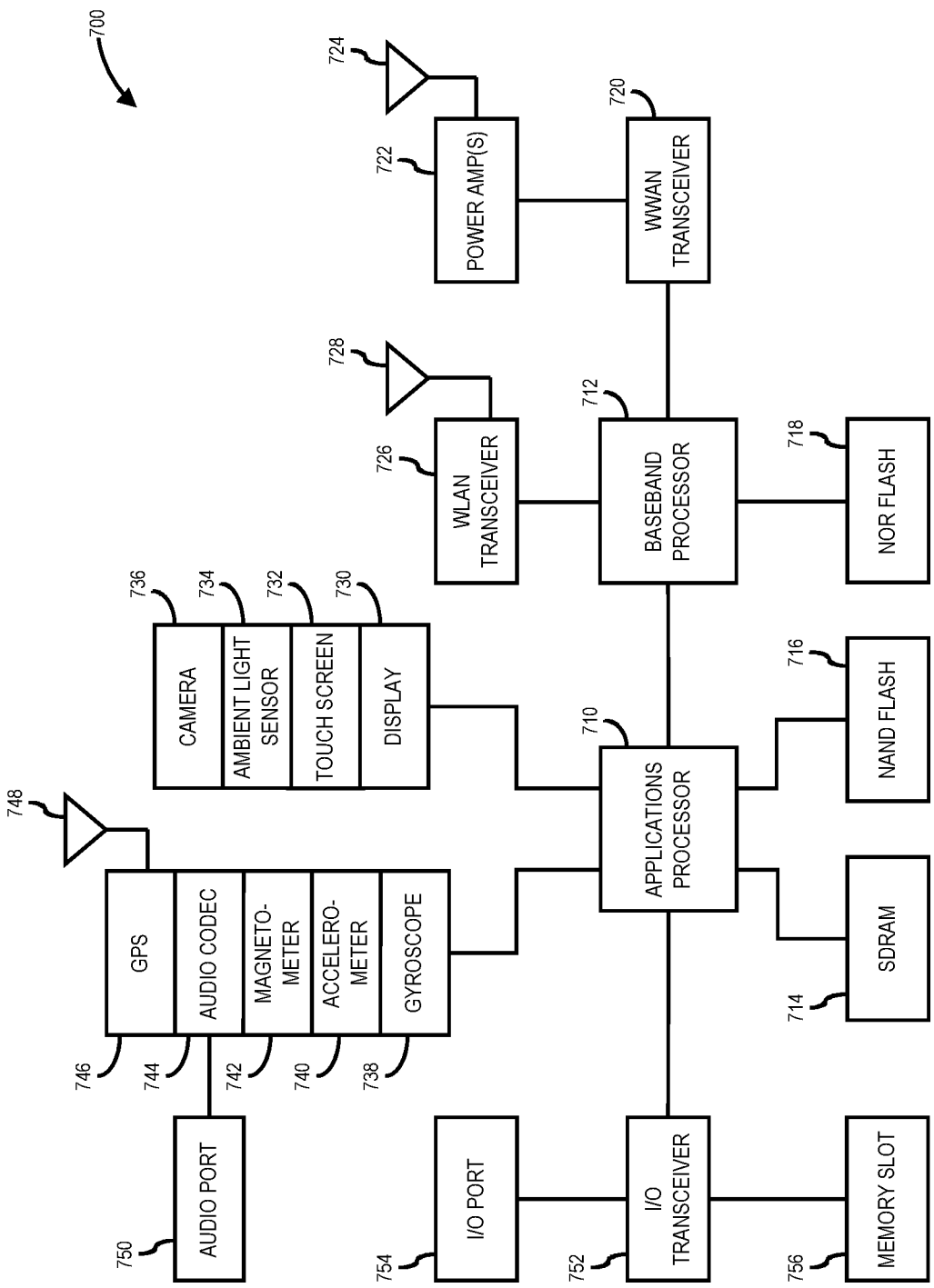
FIG. 7 is a block diagram of an information handling system capable of implementing enhanced network acquisition for a fixed device in a mobile broadband network in accordance with one or more embodiments.

Referring now to FIG. 7, a block diagram of an information handling system capable of implementing an enhanced system acquisition mechanism for a fixed device in a mobile broadband network in accordance with one or more embodiments will be discussed. Information handling system 700 of FIG. 7 may tangibly embody one or more of any of the network elements or devices of the machine-to-machine system 100 as shown in and described with respect to FIG. 1. For example, information handling system 700 may represent the hardware of fixed device 118, mobile device 116 and/or base transceiver station 110, with greater or fewer components depending on the hardware specifications of the particular device or network element. Although information handling system 700 represents one example of several types of computing platforms, information handling system 700 may include more or fewer elements and/or different arrangements of elements than shown in FIG. 7, and the scope of the claimed subject matter is not limited in these respects.

In one or more embodiments, information handling system 700 may include an applications processor 710 and a baseband processor. Applications processor 710 may be utilized as a general purpose processor to run applications and the various subsystems for information handling system 700. Applications processor 710 may include a single core or alternatively may include multiple processing cores wherein one or more of the cores may comprise a digital signal processor or digital signal processing core. Furthermore, applications processor 710 may include a graphics processor or coprocessor disposed on the same chip, or alternatively a graphics processor coupled to applications processor 710 may comprise a separate, discrete graphics chip. Applications processor 710 may include on board memory such as cache memory, and further may be coupled to external memory devices such as synchronous dynamic random access memory (SDRAM) 714 for storing and/or executing applications during operation, and NAND flash 716 for storing applications and/or data even when information handling system 700 is powered off. Baseband processor 712 may control the broadband radio functions for information handling system 700. Broadband processor 712 may store code for controlling such broadband radio functions in a NOR flash 718. Baseband processor 712 controls a wireless wide area network (WWAN) transceiver 722 which is used for modulating and/or demodulating broadband network signals, for example for communicating via a 3GPP LTE network or the like as discussed herein with respect to FIG. 2. The WWAN transceiver 720 couples to one or more power amps 722 respectively coupled to one or more antennas 724 for sending and receiving radio-frequency signals via the WWAN broadband network. The baseband processor 712 also may control a wireless local area network (WLAN) transceiver 726 coupled to one or more suitable antennas 728 and which may be capable of communicating via a Wi-Fi, Bluetooth, and/or an amplitude modulation (AM) or frequency modulation (FM) radio standard including an IEEE 802.11 a/b/g/n standard or the like. It should be noted that these are merely example implementations for applications processor 710 and baseband processor 712, and the scope of the claimed subject matter is not limited in these respects. For example, any one or more of SDRAM 714, NAND flash 716 and/or NOR flash 718 may comprise other types of memory technology such as magnetic memory, chalcogenide memory, phase change memory, or ovonic memory, and the scope of the claimed subject matter is not limited in this respect.

In one or more embodiments, applications processor 710 may drive a display 730 for displaying various information or data, and may further receive touch input from a user via a touch screen 732 for example via a finger or a stylus. An ambient light sensor 734 may be utilized to detect an amount of ambient light in which information handling system 700 is operating, for example to control a brightness or contrast value for display 730 as a function of the intensity of ambient light detected by ambient light sensor 734. One or more cameras 736 may be utilized to capture images that are processed by applications processor 710 and/or at least temporarily stored in NAND flash 716. Furthermore, applications processor may couple to a gyroscope 738, accelerometer 740, magnetometer 742, audio coder/decoder (CODEC) 744, and/or global positioning system (GPS) controller 746 coupled to an appropriate GPS antenna 748, for detection of various environmental properties including location, movement, and/or orientation of information handling system 700. Audio CODEC 744 may be coupled to one or more audio ports 750 to provide microphone input and speaker outputs either via internal devices and/or via external devices coupled to information handling system via the audio ports 750, for example via a headphone and microphone jack. In addition, applications processor 710 may couple to one or more input/output (I/O) transceivers 752 to couple to one or more I/O ports 754 such as a universal serial bus (USB) port, a high-definition multimedia interface (HDMI) port, a serial port, and so on. Furthermore, one or more of the I/O transceivers 752 may couple to one or more memory slots 756 for optional removable memory such as secure digital (SD) card or a subscriber identity module (SIM) card, although the scope of the claimed subject matter is not limited in these respects.

Figure 8:
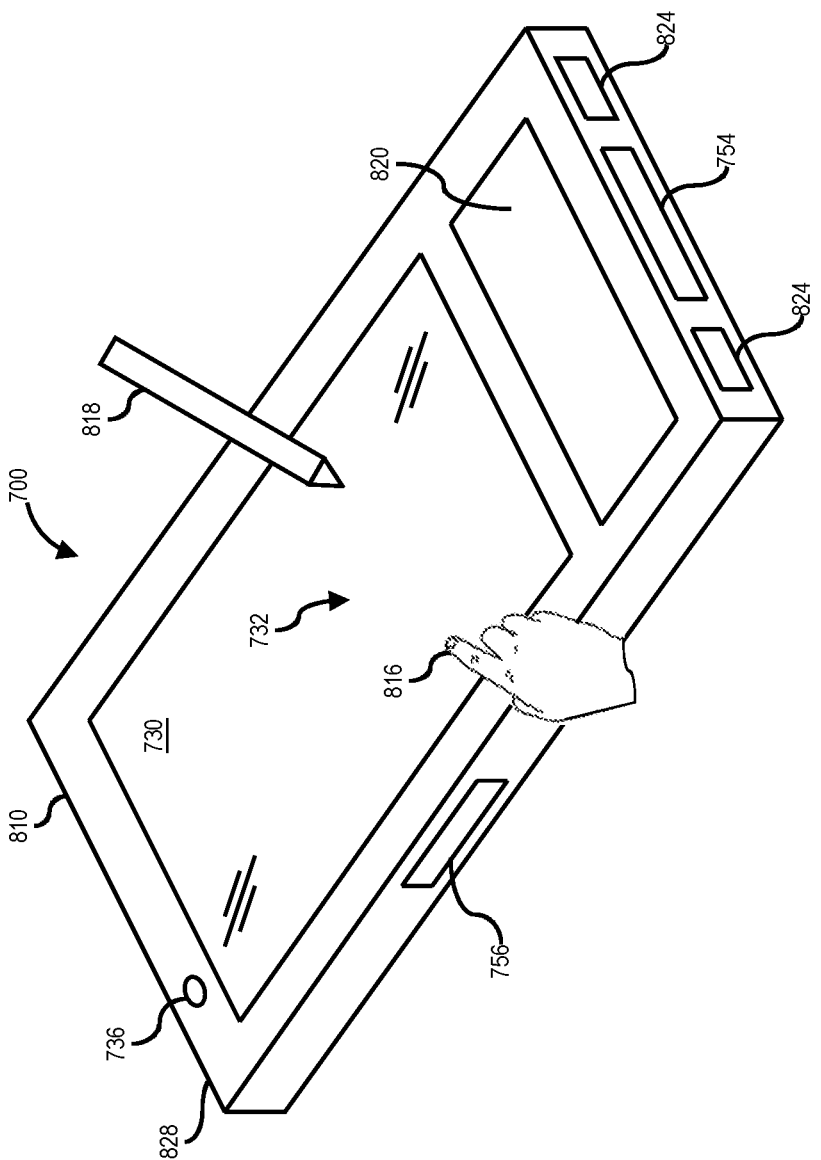
FIG. 8 is an isometric view of an information handling system of FIG. 7 that optionally may include a touch screen in accordance with one or more embodiments.

FIG. 8 is an isometric view of an information handling system of FIG. 7 that optionally may include a touch screen in accordance with one or more embodiments. FIG. 8 shows an example implementation of information handling system 700 of FIG. 7 tangibly embodied as a cellular telephone, smartphone, or tablet type device or the like. In one or more embodiments, the information handling system 700 may comprise fixed device 118 or mobile device 116 of FIG. 1, although the scope of the claimed subject matter is not limited in this respect. The information handling system 700 may comprise a housing 810 having a display 730 which may include a touch screen 732 for receiving tactile input control and commands via a finger 816 of a user and/or a via stylus 818 to control one or more applications processors 710. The housing 810 may house one or more components of information handling system 700, for example one or more applications processors 710, one or more of SDRAM 714, NAND flash 716, NOR flash 718, baseband processor 712, and/or WWAN transceiver 720. The information handling system 700 further may optionally include a physical actuator area 820 which may comprise a keyboard or buttons for controlling information handling system via one or more buttons or switches. The information handling system 700 may also include a memory port or slot 756 for receiving non-volatile memory such as flash memory, for example in the form of a secure digital (SD) card or a subscriber identity module (SIM) card. Optionally, the information handling system 700 may further include one or more speakers and/or microphones 824 and a connection port 754 for connecting the information handling system 700 to another electronic device, dock, display, battery charger, and so on. In addition, information handling system 700 may include a headphone or speaker jack 828 and one or more cameras 736 on one or more sides of the housing 810. It should be noted that the information handling system 700 of FIG. 8 may include more or fewer elements than shown, in various arrangements, and the scope of the claimed subject matter is not limited in this respect.

Although the claimed subject matter has been described with a certain degree of particularity, it should be recognized that elements thereof may be altered by persons skilled in the art without departing from the spirit and/or scope of claimed subject matter. It is believed that the subject matter pertaining to system acquisition mechanisms for fixed devices in mobile broadband networks and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. An apparatus of a bandwidth reduced low complexity (BL) UE, comprising:
a memory to store system information for a network; and
one or more baseband processors to:
decode information from a bandwidth reduced (BR) system information block (SIB) that includes a value tag;
ignore system information blocks that are not BR SIBS;
read the value tag to verify whether the system information is still valid; and
if the system information is no longer valid,
acquire new system information from the network, and
update the system information in the memory with the new system information; and
otherwise also ignore the BR SIB when the value tag indicates that the system information is still valid.

2. The apparatus of claim 1, wherein the one or more baseband processors are to continue using the system information stored in the memory until the new system information is acquired.

3. The apparatus of claim 1, wherein the one or more baseband processors are to perform network acquisition using the new system information.

4. The apparatus of claim 1, wherein the BR SIB comprises a specific SIB for bandwidth reduced low complexity (BL) UEs.

5. The apparatus of claim 1, wherein the one or more baseband processors are configured to receive the BR SIB via a shared channel or via a broadcast channel.

6. The apparatus of claim 1, wherein the BR SIB is scheduled to occur separate from system information block-1 (SIB-1).

7. An apparatus of an evolved NodeB (eNB) to communicate with a bandwidth reduced low complexity (BL) UE, the eNB comprising:
a memory to store information for a network;
one or more baseband processors to encode a bandwidth reduced (BR) system information block (SIB) for the BL UE wherein the BR SIB includes a value tag that indicates to the BL UE whether system information for the network is still valid;
to encode other system information blocks that are not BR SIBs; and
if the system information is no longer valid, to encode new system information to be acquired by the BL UE; and
to otherwise not encode the BR SIB when the system information is still valid.

8. The apparatus of claim 7, wherein the one or more baseband processors are to continue to communicate with the BL UE using the system information stored in the memory until the new system information is acquired by the UE.

9. The apparatus of claim 7, wherein the one or more baseband processors are to engage in network acquisition with the BL UE using the new system information.

10. The apparatus of claim 7, wherein the BR SIB comprises a specific SIB for bandwidth reduced low complexity (BL) UEs.

11. The apparatus of claim 7, wherein the one or more processors are configured to send the BR SIB to the UE via a shared channel or via a broadcast channel.

12. The apparatus of claim 7, wherein the one or more baseband processors are to schedule the BR SIB to occur separate from system information block-1 (SIB-1).

13. One or more non-transitory storage media that, when executed by an apparatus of a bandwidth reduced low complexity (BL) UE, result in:
decoding information from a bandwidth reduced (BR) system information block (SIB) received from a network wherein the BR SIB includes a value tag;
ignoring system information blocks that are not BR SIBS;
reading the value tag to verify whether system information for the network is still valid; and
if the system information is no longer valid,
acquiring new system information from the network, and
updating the system information with the new system information; and
otherwise also ignoring the BR SIB when the value tag indicates that the system information is still valid.

14. The one or more non-transitory storage media of claim 13, wherein the instructions, when executed, further result in continuing to use previous information until the new system information is acquired.

15. The one or more non-transitory storage media of claim 13, wherein the instructions, when executed, further result in performing network acquisition using the new system information.

16. The one or more non-transitory storage media of claim 13, wherein the BR SIB comprises a specific SIB for bandwidth reduced low complexity (BL) UEs.

17. The one or more non-transitory storage media of claim 13, wherein the instructions, when executed, further result in receiving the BR SIB via a shared channel or via a broadcast channel.

18. The one or more non-transitory storage media of claim 13, wherein the BR SIB is scheduled to occur separate from system information block-1 (SIB-1).

* * * * *